United States Patent [19]

Sassaman et al.

[11] 4,206,170
[45] Jun. 3, 1980

[54] METHOD OF MOLDING A TORUS SHAPED ARTICLE

[75] Inventors: William O. Sassaman, Akron; James M. Hogan, Tallmadge, both of Ohio

[73] Assignee: The Goodyear Tire & Rubber Company, Akron, Ohio

[21] Appl. No.: 575,101

[22] Filed: May 6, 1975

[51] Int. Cl.² .............................................. B29C 5/04
[52] U.S. Cl. .................................. 264/310; 264/326; 425/812
[58] Field of Search .............. 264/326, DIG. 67, 299, 264/310; 249/56, 57, 137, 138, 141; 425/812

[56] References Cited

U.S. PATENT DOCUMENTS

| 233,608 | 10/1880 | Fleming | 249/137 |
| 331,437 | 12/1885 | Platt | 249/137 |
| 352,559 | 11/1886 | Munton | 249/56 |
| 1,943,026 | 1/1934 | McCreary et al. | 249/137 |
| 2,349,213 | 5/1944 | Van Niekerk | 264/311 |

*Primary Examiner*—James B. Lowe
*Attorney, Agent, or Firm*—J. D. Wolfe

[57] ABSTRACT

A torus shaped article can be molded using a liquid injection molding composition by placing a torus shaped mold at an angle of 1° to 45° with the horizontal, charging the mold at a port having a higher elevation and immediately rotating the mold to position the vent port at a point higher than the charging port.

5 Claims, 3 Drawing Figures

METHOD OF MOLDING A TORUS SHAPED ARTICLE

This invention relates to a method for molding a torus shaped article and to the equipment for molding said article. More particularly, this invention relates to molding low load tires such as bicycle tires.

Although liquid injection molding (LIM) of tires has been achieved on an experimental scale for a score of years or more, difficulties have been experienced with producing tires having a satisfactory surface appearance because of numerous surface voids and bubbles therein. Consequently, these experimental tires were repaired by filling the voids or bubbles to improve the appearance, or had to be scrapped.

Also, in LIM it has been customary to place the surface of the molded article requiring the best appearance on the underside of the mold, but this is not possible with tires as all the surfaces of a tire need an excellent appearance.

Therefore, the object of this invention is to provide a method for LIM torus shaped articles having a satisfactory appearing surface.

Figure 1:
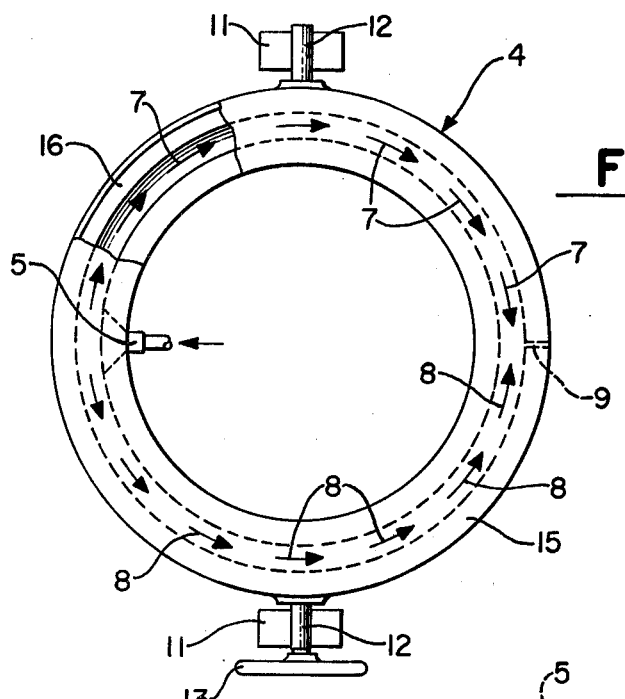
Figure 2:
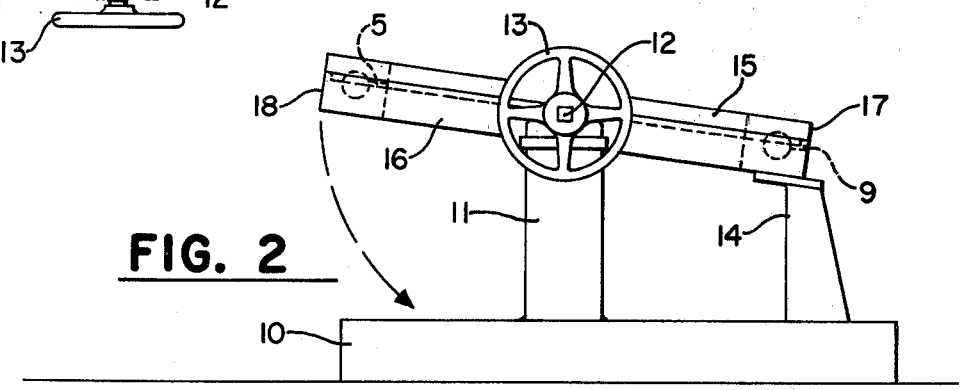
Figure 3:
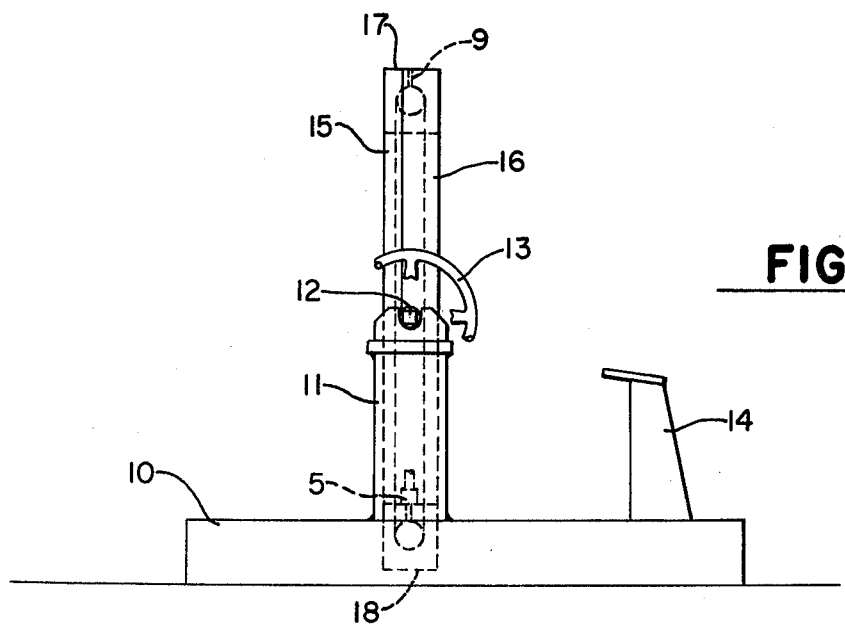

The nature of this invention and its objects and advantages can be more readily understood by reference to the following drawings wherein FIG. 1 is a schematic plan view showing the path of the liquid reaction mixture flowing into the mold;

FIG. 2 is an elevational view of the molding apparatus with the mold positioned in the filling position, and FIG. 3 is the same view as FIG. 2 except the mold has been moved to the cure position.

Referring to FIG. 1, numeral 4 indicates schematically a mold positioned in the pouring position such as that shown in FIG. 2 with the pour point 5 of the mold being positioned as best seen in FIG. 2, with the pour point being slightly raised relative to the rest of the mold, usually 1 to 45 degrees, with the preferred angle of tilt being 3 to 15 degrees from the horizontal. The liquid reaction mixture is charged into the mold through the opening 5 which preferably has a tapered or fan-shaped contour, as shown in FIG. 1. As the liquid flows into the mold it separates and flows around the cavity of the mold in the manner shown by arrows 7 and 8 until the two streams of liquid 7 and 8 meet at a point essentially opposite the pour point 5. As the liquid flows and fills the mold the excess liquid and air is vented through the vent port 9. When sufficient liquid has been charged to fill the mold, the addition of the liquid is stopped and the mold is tilted to rest in the position best seen in FIG. 3 where the pour point 5 is at the bottom position in the view and the vent 9 rests in the highest elevation of the mold, this being the point essentially where the two streams 7 and 8 come together.

Referring more specifically to FIGS. 2 and 3, numeral 10 represents the base member and numeral 11 represents the mold support member in which the mold is pivoted by pivot pins 12 and is rotatable by means of a rotating means such as a hand member, crank, or wheel 13.

In LIM or liquid injection moldings, the ingredients used to make the moldings are blended together to form a liquid mixture which is injected into the mold cavity as a liquid and caused to react to give a set material that retains its shape when removed from the mold. One of the preferred LIM mixtures is the liquid polyurethane reaction mixture including those capable of producing a porous rather than a homogeneous polyurethane casting. Generally, the polyurethane reaction mixture is made by quasi-prepolymer, prepolymer or one-shot methods by mixing a reactive hydrogen containing composition, preferably 500 to 6500 molecular weight, an organic polyisocyanate and a curative such as a low molecular weight polyol or polyamine or alcoholamines. Generally, the reactive hydrogen containing composition can be selected from the polyether polyols, polyester polyol and the hydrocarbon polyol and the organic polyisocyanates are selected from the aliphatic, cycloaliphatic and aromatic polyisocyanates. The curatives generally are the glycols having from 2 to 20 carbon atoms and the diamines listed in Kogon's U.S. Pat. No. 3,194,793.

The nature of this invention can be more readily appreciated by the following example where parts and percentages are by weight unless otherwise designated.

EXAMPLE I

An aluminum mold having an upper part 15 and a lower part 16 was mounted in the mold support apparatus of the drawings and clamped in the closed position to give a mold having a cavity in the shape of a bicycle tire. The mold was tilted to cause the end 17 to rest on mold stop 14 and the end 18 to project upward from base 10 to form an angle with the base 10 of about 10 degrees. Then the mold was charged through the fan shape mold opening 5 with a LIM charge of the mixture to give the desired fill of mold and cause any excess to escape through sprue openings 9. Then the charging of the mold was stopped and the mold was rotated within less than 10 seconds to rest in the position shown in FIG. 3 with the pour opening 5 resting at the lower position and the sprue opening 9 being in the uppermost position. After the mixture was set or cured the mold was opened and a bicycle tire was removed that had excellent appearance and freedom from displeasing bubbles and void spots.

The polyurethane reaction mixture used to mold this bicycle tire was made by mixing 88 parts of an ethylene oxide (approximately 12%) capped propylene oxide adduct of trimethylol propane of about 5000 molecular weight with 12 parts of 1,4-butanediol, 0.15 parts of dibutyltin dilaurate, 0.05 parts of triethylene diamine, 1.25 parts of a carbon black pigment, 8 parts of monofluorotrichloromethane and 55 parts of a quasi-prepolymer of methane-(diphenylisocyanate) and a tripropylene ether glycol having 22 percent free NCO and a reactive index of 105, based on the ratio of NCO to the total hydroxyls present.

Although the polyetherurethane bicycle tire can be made in a mold at ambient temperature, it is preferred that the mold be at 38° to 70° C. to give faster processing times, i.e. the tire can be demolded in two minutes or less if desired, but usually a longer mold cycle is used to give the desired flexibility in the molding line. Also, it is preferred that mixing of the ingredients occurs at 25° to 50° C. to reduce the viscosity of the mix, control expansion, cure, and allow the mold to be more readily filled.

These ingredients were mixed in an Admiral ®mixing apparatus and then injected immediately through an opening or gate into the mold, allowed to react to yield an essentially cured tire when stripped from the mold. The LIM may be allowed to set rather than fully cure before demolding and then be given a post cure at temperatures of 25° C. to 120° C. for the time necessary to give the necessary degree of cure.

While certain representative embodiment and details have been shown for the purpose of illustrating the invention it will be apparent to those skilled in this art that various changes and modifications may be made therein without departing from the spirit or scope of the invention.

What is claimed is:

1. In a method of molding a toroidal shaped article comprising the steps of injecting into a toroidal mold a liquid injection composition comprising a liquid polyurethane reaction mixture of a polyether polyol or polyester polyol, an organic polyisocyanate and a curative selected from the class consisting of glycol and diamine and curing said composition, the improvement comprising positioning a toroidal shaped mold at an angle of 1° to 45° with the horizontal, said mold having a charging port at a higher elevation, charging said mold through said port to permit the composition to flow around to a vent port opposite the charging port, immediately rotating the mold to position the vent port at a point higher than the charging port.

2. The method of claim 1 wherein the angle the mold makes with the horizontal is 3 to 15 degrees.

3. The method of claim 1 wherein the liquid injection composition is a mixture of an ethylene oxide capped propylene oxide adduct of trimethylol propane of about 5000 molecular weight, butanediol and a quasi-prepolymer of methane-(diphenyl isocyanate) and tripropylene ether glycol containing about 22 percent free NCO.

4. The method of claim 3 wherein the mold is rotated after charge of liquid injection composition to place the charging port at the lowest level with the mold in vertical position.

5. The method of claim 3 wherein the mold is rotated within 10 seconds of charging the liquid injection composition.

* * * * *